United States Patent

[11] 3,625,827

[72] Inventors Bernard S. Wildi
Kirkwood;
Thomas L. Westman, St. Louis, both of Mo.
[21] Appl. No. 763,343
[22] Filed Sept. 27, 1968
[45] Patented Dec. 7, 1971
[73] Assignee Monsanto Company
St. Louis, Mo.

[54] WATER-SOLUBLE POLYMER-ENZYME PRODUCTS
19 Claims, No Drawings

[52] U.S. Cl. .................................................. 195/63,
195/DIG. 11, 195/68
[51] Int. Cl. .................................................. C12k 1/00
[50] Field of Search ........................................... 195/63, 63
P, 66, 68

[56] References Cited
UNITED STATES PATENTS
3,436,309 4/1969 Ottinger et al. ............... 195/63 X
3,507,750 4/1970 Murray et al. ................. 195/66

OTHER REFERENCES
Mitz, et al., Nature, Feb. 1961 Vol. 189 (pgs. 576–577).
Goldstein, et al., Biochemistry, Dec. 1964 Vol. 3, No. 12 (pgs. 1913–1914).
Hornby, et al., Biochemical Journal, 1966, Vol. 98 (pgs. 420–425).
Proceedings of the Biochemical Society, Biochemical Journal, Mar. 1968, Vol. 107 (pgs. 2P, 3p, and 5p).

*Primary Examiner*—Lionel M. Shapiro
*Assistant Examiner*—D. M. Naff
*Attorneys*—Gordon W. Hueschen, Hueschen and Kurlandsky and John D. Upham ABSTRACT: Polymer-enzyme products wherein the enzyme is covalently bound to the polymer chain, the polymer-enzyme product being water soluble. The products have wide applicability as stable, long-acting, enzymatic materials, having same general type of activity as parent enzyme, but with different pH optimum activity and range of applicability, and are stable, substantially colorless and odorless, long acting, and remarkably less subject to autogenous deterioration or destruction by other enzymes.

WATER-SOLUBLE POLYMER-ENZYME PRODUCTS

BACKGROUND OF INVENTION

1. Field of Invention

Polymer-enzyme products; water soluble.

2. Prior Art

It is well known that native enzymes often display instability in solution and that such instability results from autolysis in the case of proteolytic enzymes or, for other types of enzymes, accompanying proteases cause inactivation by digestion of said enzymes. Similarly, native enzymes may become inactivated due to denaturation caused by heat, the pH of the solution, and/or other well-documented phenomena.

Examples are also to be found in the literature of simple chemically modified enzymes (e.g., succinylated, nitrated, etc.) which have enhanced or modified enzymatic properties. In general, however, these enzyme derivatives often do not display enhanced solution stability compared to the native enzyme. In addition, an attendant problem associated with such enzyme derivatives is the difficulty in separating these derivatives from the native enzyme.

Some insoluble polymeric derivatives of enzymes have been shown to have enhanced solution stability as compared to the native enzymes or their simple chemical derivatives. Moreover, isolation of insoluble polymer-enzyme products is readily achieved as via centrifugation and removal of unbound enzyme is achieved by washing of the insoluble polymer-enzyme products.

Whereas in certain cases it may be desirable to utilize a stable, insoluble polymeric derivative of an enzyme, such utilization involves contacting a substrate solution with the solid enzyme derivative, or a solid substrate with the solid enzyme derivative. It is well known that such heterogeneous phase reactions are less efficient due to poor contact of substrate with the enzyme catalyst. This particularly apparent for biochemical reactions where the substrate, such as a protein, lipid or polysaccharide, is often large and the enzyme is also large as well. Moreover, such insoluble polymer enzyme derivatives employ a marked degree of cross linking to effect insolubility. Such cross linking can therefore often cause entrapment of the enzyme within the three-dimensional network with resulting inaccessibility of the enzyme to the substrate, thus reducing the entrapped enzyme to an ineffective catalyst. A solution to this problem of more convenient contact would be highly desirable.

As already stated, insoluble polymer-enzyme derivatives are known. Insoluble polymer-enzyme products reported have been characterized by a very desirable pH shift of optimum enzymatic activity, which in effect provides a new enzyme, operative in the same or substantially the same way, but under different conditions than, the native enzyme. Frequently, these insoluble products have a diminished, reduced, or different type or extent of enzymatic activity than the parent enzyme, being characterized by a different bond-splitting or hydrolyzing capacity than the parent enzyme. Such changed characteristics, in effect giving rise to a new enzyme, would be highly desirable in a soluble polymer-enzyme system. However, the researchers who have reported the insoluble enzyme-polymer products of these remarkably differing properties, have not reported corresponding water-soluble enzyme-polymer products.

The only case of a soluble enzyme-polymer product known to us has reportedly provided products having enzymatic activity, in fact greater even than the enzyme from which they were derived. However, these authors also reported that there was no change in the pH activity characteristics of their particular trypsin and chymotrypsin polymer products. [Mitz et al., Nature 189, 576 (1961)]. In theory, this reported finding could be explained by more complete substrate accessibility to the polymer-enzyme due to its soluble form but, whatever the explanation, this reported result was disappointing from the standpoint of effectively providing new enzymatic products which are constructively tantamount to new enzymes, having their greatest activity in a different range than the parent, and thus giving rise to different applications for which the parent is not ideally, if at all, suited. Thus, to the present, no soluble polymer-enzyme products have been available which differ from the parent enzyme in the important characteristic of pH optimum activity, if in fact any soluble polymer-enzyme product has been available at all. We have unpredictably been able, according to the present invention, to provide the same. Such provision is an unobvious, unpredictable, and important advance in the art.

SUMMARY OF THE INVENTION

The present invention provides novel water-soluble products in which an enzyme is covalently bonded to a selected polymer and a process for their production. These novel polymer-enzyme products have valuable and unpredictable properties. Why their properties differ from the properties reported by Mitz et al. is not presently known, and perhaps may never be ascertained, but suffice it to say that the cited publication leads directly away from a recognition that any soluble polymer-enzyme products have or may have the highly desirable pH activity shift, as we have found to characterize our different trypsin and chymotrypsin-polymeric products, in direct contrast to Mitz et al. who state that there was no shift in the pH optimum for their corresponding but still importantly different trypsin and chymotrypsin-polymeric products.

Unexpectedly, it has now been found that soluble polymer enzyme products can be prepared which possess the remarkably modified enzyme properties of the insoluble polymeric derivatives. The soluble chymotrypsin and trypsin polymer products of the invention have been found to have a pH activity profile strikingly different from the native enzyme. This is entirely unexpected in view of Mitz et al. and even more unexpected since the substrate should have more complete accessibility to the attached enzyme which is now not associated with a cross-linked system, as is characteristic of insolubles.

Also surprisingly, the stability of these soluble polymer-enzyme derivatives is still found to be increased relative to the native enzyme, and this increased stability may be the result of several possible factors but it cannot be readily explained at this time. At any rate, these soluble products are remarkably stable against autolysis and denaturation, even in solution.

Moreover, in the case of the simple chemically modified enzymes, as mentioned above, these cannot be separated readily from native enzyme except with extreme difficulty and usually only on a small scale. A totally unexpected discovery was made that soluble polymer-enzyme products can be separated from unattached enzyme by chromatography on cross-linked dextrans (Sephadex Pharmacia Co., Uppsala, Sweden). It was discovered that hydrolyzed polymer (e.g., EMA) and the soluble polymer-enzyme product are eluted in the void volumes of such columns regardless of the exclusion limits of the Sephadex (up to and including Sephadex G-200, exclusion limits approximately 150,000 molecular weight). Furthermore, it has been discovered that Sephadex chromatography of mixtures of soluble polymeric derivatives of enzymes with the native enzyme and also mixtures of polymer, e.g., hydrolyzed EMA, and enzymes in general are readily separated from one another by Sephadex chromatography providing the enzyme is not of a molecular weight so large as to be eluted in the void volume of such columns.

That this separation technique is valid is shown by the fact that chromatographically purified soluble polymer-enzyme products do not migrate upon disk gel electrophoresis whereas enzymes in the presence of polymers, e.g., hydrolyzed EMA, do migrate normally. In addition, it has been shown that enzyme and hydrolyzed polymer, e.g., hydrolyzed EMA, are separated by Sephadex chromatography as evidences by low optical density of void volume eluates as measured at 280 m$\mu$. Similarly, biological activity and nitrogen content of void volume eluates are low when enzyme-polymer, e.g., hydrolyzed EMA, mixtures are chromatographed on Sephadex. On the other hand, the soluble polymer-enzyme derivatives possess biological activity. This method therefore constitutes a process whereby soluble polymer-enzyme products can be separated from contaminating and unbound enzyme due to their unique physical properties.

As mentioned above, the soluble polymer-enzyme products therefore can be said to have the desirable property of solubility such as of the native enzyme, facilitating desirable substrate contact, and concomitantly also possess the desirable properties of enhanced stability and modified biological behavior such as characterize the insoluble polymer-enzyme derivatives.

Such soluble polymer-enzyme products have advantages uniquely different from either native enzymes or their insoluble polymeric derivatives. For example, such soluble derivatives may be used to act upon biological and synthetic substrates based fundamentally upon the characteristic biological action of the attached enzyme but within their optimally active pH range. Subsequently such soluble derivatives may be separated from the treated substrate by Sephadex chromatography as described above. The soluble polymeric derivative may then be reisolated and reused.

Alternatively, the soluble enzyme-polymer product may be contained in a chamber to which is attached a porous membrane as one wall thereof. Such a porous membrane possesses the ability to allow passage of low molecular weight substances but not those of high molecular weight, such as the soluble polymer-enzyme derivative. Hence, the soluble enzyme-polymer product is used to treat substrates such that, after treatment, the products from digestion of the substrate are separated from the soluble enzyme-polymer product by passage through the size-limiting porous membrane whereas the soluble enzyme-polymer product remains behind for subsequent isolation or reuse.

One example of this latter type of processing involves SEMAT (Soluble EMA-Trypsin) digestion of RIBOX (oxidized ribonuclease) according to C. H. W. Hirs, J. Biol. Chem. 219, 611 (1956). The reaction is allowed to proceed to completion in a Diaplex Ultrafil Model 400 Cell (Amicon Corporation, Cambridge, Massachusetts) to which is attached a UM–1 Diaflo Membrane (Amicon Corp.), exclusion limits ca. 10,000. After the reaction is completed, the digested RIBOX fragments are separated by passage through the membrane whereas the SEMAT remains contained in the reaction vessel. Subsequently, the vessel is recharged with RIBOX solution, the digestion proceeds, and products are isolated as above. Hence, there is provided a method for continuous, semicontinuous, or batchwise biological processing, isolation of products, and subsequent reuse of the soluble polymer-enzyme derivative.

Another example of a highly advantageous use of soluble polymer-enzyme products involves their ease of application in the form of stable solutions. For example, a soluble cellulase/EMA derivative in solution form can be sprayed onto cellulose or cellulose-containing material with subsequent digestion of the cellulose, releasing glucose. Recovery and reuse is possible. Other advantages accruing to the novel soluble polymer-enzyme products of the invention and in their use are too numerous to mention and will be apparent to one skilled in the art.

OBJECTS

The provision of novel water-soluble polymer-enzyme products having any or all of the foregoing enumerated advantages or advantageous properties or characteristics, and a process for the production of such water-soluble polymer-enzyme products, is one of the objects of the present invention. Other objects will become apparent hereinafter and still others will be obvious to one skilled in the art.

GENERAL DESCRIPTION OF THE INVENTION

Definitions

EMA is a polymer of ethylene and maleic anhydride. Polymers of this type are of great value according to the present invention.

"EMA-type" polymer is defined hereinafter.

"EMA-enzyme" or "EMA/enzyme" is a copolymer of ethylene and maleic anhydride having enzyme covalently bonded thereto. The product is the same whether the enzyme is reacted directly with an anhydride group of the ethylene-maleic anhydride copolymer or with a carboxyl group of ethylene-maleic anhydride copolymer, whether or not using an intermediate activating mechanism for carboxyl groups of the polymer. Anhydride groups not participating in the reaction by which the product is produced in aqueous medium are present in the product as carboxyl or carboxylate groups. Such nonparticipating groups may, however, be converted to amide, imide, ester, etc., groups, as can be present in EMA-type polymers, as hereinafter defined.

"Water insoluble" means that the product concerned does not dissolve in water or aqueous solutions, although it may have such characteristics as a high degree of swelling due to water solvation, even to the extent of existence in gel form. "Water soluble" means not water insoluble, and is further defined hereinafter.

The product of the invention is a water-soluble enzymatically active polymer-enzyme product wherein the enzyme is bound covalently through a group which is nonessential for enzymatic activity to (a) a polymer comprising chains of carboxylic acid or carboxylic acid anhydride units, said polymer chains being formed by polymerization of polymerizable acids or anhydrides, or (b) a polymer comprising units of carboxylic acid or carboxylic acid anhydride groups separated by carbon chains of at least one and not more than four carbon atoms, said carbon chains being part of a unit which contains a maximum of 18 carbon atoms, said polymer being formed by copolymerizing a polymerizable acid or anhydride with another copolymerizable monomer, and preferably wherein the starting acid or anhydride and any additional copolymerizable monomer are unsaturated and such polymerization or copolymerization comprises addition-type polymerization or copolymerization involving such unsaturation.

Process

Polymer-enzyme derivatives can be prepared by reacting the crystalline or crude enzyme or mixture of enzymes with the polymer in solution, resulting in formation of a polymeric product in which the enzyme is covalently bound. Since an anhydride or carboxyl is present in the polymer, e.g., an EMA-type polymer, covalent bonding of the enzyme to the polymer may be effected directly through reaction of coupling with an anhydride group or with a carboxyl group using a carboxyl activating agent. The product is the same in both cases. The pH range for the reaction depends upon the enzyme employed and its stability range. It is usually about 5 to 9.5, preferably about 6–8, but adjustment must be made for individual cases. Isolation and purification is generally effected according to normal biochemical procedures, and by the general procedure of the examples which follow. Since covalent bonding of the enzyme to the polymer is desired, the reaction is ordinarily carried out at low temperatures and at relatively neutral pH's, in water or dilute aqueous buffer as solvent.

When carried out in this manner, the results are production of the desired active polymer-enzyme derivative, but degree of activity imparted to the polymeric product is sometimes lower than desired, possibly due to partial inactivation of the enzyme during the process. Resort may frequently advantageously be had to employment of a mixed solvent system, using a solvent in which the enzyme is at least partially soluble, usually in an amount up to about 50 percent by volume. Dimethylsulfoxide (DMSO) is especially suitable as solvent together with water or aqueous buffer solution in a mixed solvent system. Using such a mixed solvent system, the desired active enzyme-polymer product is ordinarily obtained in higher yields and conversions to desirably active product, and introduction of desirably high amounts of enzyme activity into the polymer molecule is generally less difficult.

As stated, the polymer in such reaction contains carboxyl or anhydride linkages, especially where the enzyme contains an amino, hydroxyl (including phenolic hydroxyl), or sulfhydryl group not essential for its enzymatic activity. The polymer is preferably EMA or an EMA-type polymer, but it can be any of those types herein disclosed for coupling or reaction with an enzyme, and in any event it is adapted to effect covalent bonding with the enzyme to produce an enzyme-polymer product either directly or indirectly using an activating agent. Inasmuch as the enzymatic activity of the starting enzyme is desired to be retained in the final product, it is of course firstly necessary that bonding of the to the polymer be through a group which will not result in inactivation of an active site in the enzyme molecule. Among the various reactive groups of enzyme molecules may be mentioned, besides amino and sulfhydryl, also hydroxyl (including phenolic hydroxyl), carboxyl and imidazolyl. Such groups are present in free or unbound form in inactive portions of enzyme molecules, as in a lysine, cysteine, serine, threonine, histidine, or tyrosine moiety of an enzyme molecule, where the particular moiety in question is not considered essential for enzymatic activity, either catalytic in nature or for substrate binding. Therefore, attachment to the polymer molecule is through reaction of the polymer with such group so as to avoid inactivation of the enzyme during attachment to the polymer molecule. Generally the linkage is an amide, imide, ester, thioester, or disulfide group, such as formed by the carboxyl or anhydride with an amine or hydroxyl group in a nonessential moiety of the enzyme protein chain. Amides are conveniently formed by reacting pendant amino groups of the enzyme with carboxylic anhydride groups on the carrier polymer in water, in aqueous buffer media, or in mixed solvents. Amides, imides and esters are readily formed by activating carboxyl groups of the polymer, and reacting them with respective hydroxyl, amine or mercaptan groups on the other reactant. Such activation may be effected using various carbodiimides, carbodiimidazoles, Woodward's or Sheehan's reagent, or the like, to form highly active intermediates capable of reacting with groups in the enzyme under mild conditions, the latter favoring retention of enzymatic activity.

The polymer selected for such reaction can therefore be said to be adapted to couple or react with the enzyme, either directly or indirectly through use of an activating agent, as already indicated, and in any event to effect covalent bonding with the enzyme. The attachment procedures given are conducted by techniques adapted to include any requisite protection for the enzyme, which may include a reversible blocking of the enzymatically active site or sites, as for example in the case of papain, where mercuripapain or zinc papain may be employed as an intermediate for reaction with the polymer in order to effect greater yields upon attachment, the protecting atoms being removed subsequent to the attachment reaction.

General Procedure for Solubles Preparation

In order to achieve high yields of water-soluble enzyme-polymer products, it is desirable to avoid cross linking which results in insolubilization.

To prepare water-soluble enzyme-polymer derivatives, therefore, the reaction is preferably performed under substantially noncross-linking conditions. The undesired cross linking can be reduced by performing the attachment reaction in high dilution such that fewer reactions occur between several polymer molecules and a single enzyme molecule. Alternatively, high ratios of enzyme to polymer favor reaction of several enzyme molecules with a single polymer molecule. This, therefore, results in an agglomerated enzyme/polymer system which maintains the desired soluble properties of the individual enzyme molecules. An additional way of favoring "solubles" formation is to run the reaction at high ionic strength to decrease aggregation of the native protein. While such procedures as described above are often desirable, it is not always necessary to use dilute solutions or high enzyme/polymer ratios to cause formation of soluble enzyme/polymer derivatives.

The term "water soluble" means that the product concerned dissolves in water or aqueous solutions. As usual, however, this does not mean that the product dissolves completely at all concentrations or at all pH's. On the other hand, these water-soluble products are characterized by being soluble at a variety of concentrations and pH's, and they are generally soluble at pH's of 7 or greater.

In their soluble form, the polymer-enzyme products of the invention are characterized by fundamentally the same enzymatic activity as the parent native enzyme, but have all of the advantages which are attendant upon applicability in solution or suspension form together with increased stability and prolonged activity. In addition, because of their polymeric form, even though soluble, the polymer-enzyme products of the invention are separable from native enzyme or substrates, as well as impurities and coloring matter of an undesired nature, by normal separation procedures such as centrifugation, electrophoresis, or chromatography.

POLYMERIC REACTANT

In its broadest context, the polymer to which the enzyme is to be coupled according to one or more aspects of the invention contains carboxyl or anhydride linkages, especially where the enzyme contains an amino, hydroxyl, or sulfhydryl group not essential for its enzymatic activity. The polymer may be EMA or an EMA-type polymer, or be any of those types disclosed herein for coupling or reaction with an enzyme, and in any event it is adapted to couple or react with the enzyme to effect covalent bonding and production of the desired soluble enzyme-polymer product.

Since covalent bonding is desired, it is understood that the carrier polymer is tailored to contain at least one reactive site for each polymer molecule with which the enzyme can react, either directly or indirectly, to produce a covalent bond. According to the instant invention, this reactive site (or sites) is preferably a carboxyl or carboxylic anhydride group.

The polymeric reactant, according to the invention, may be defined broadly as follows: (a) a polymer comprising chains of carboxylic acid or carboxylic acid anhydride units, said polymer being formed by polymerization of polymerizable acids or anhydrides, or (b) a polymer comprising units of carboxylic acid or carboxylic acid anhydride groups separated by carbon chains of at least one and not more than four carbon atoms, said carbon chains being part of a unit which contains a maximum of 18 carbon atoms, said polymer being formed by copolymerizing a polymerizable acid or anhydride with another copolymerizable monomer, and preferably wherein the starting acid or anhydride and any additional copolymerizable monomer are unsaturated and such polymerization or copolymerization comprises addition type polymerization or copolymerization involving such unsaturation.

Among the polymers suitable for the practice of the instant invention, polymeric polyelectrolytes having units of the formula

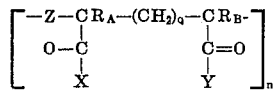

wherein: $R_A$ and $R_B$ are selected from the group consisting of hydrogen, halogen (preferably chlorine), alkyl of one to four carbon atoms (preferably methyl), cyano, phenyl, or mixtures thereof; provided that not more than one of $R_A$ and $R_B$ is phenyl; Z is a bivalent radical (preferably alkylene, phenylalkylene, lower-alkoxyalkylene, and lower-aliphatic acyloxyalkylene)

comprising a carbon chain having one to four carbon atoms, inclusive, said carbon chain being a part of a unit which contains one to 18 carbon atoms, inclusive, $q$ is zero or one, X and Y are selected from hydroxy, —O alkali metal, OR, —ONH$_4$, —ONHR$_3$, —ONH$_2$R$_2$, —ONH$_3$R, —NRR', and —(Q)$_p$—W—(NR'R')$_x$, —(Q)$_p$—W—(OH)$_x$, wherein $x$ is 1 to 4 and $p$ is zero or 1, wherein R is selected from the group consisting of alkyl, phenylalkyl, or phenyl, in each case of one to 18 carbon atoms, wherein R' is H or R, wherein Q is oxygen or —NR'—, and wherein W is a bivalent radical preferably selected from lower-alkylene, phenyl, phenylalkyl, pehnylalkyl-phenyl, and alkylphenylalkyl having up to 20 carbon atoms, X and Y taken together can be an oxygen atom, and at least one of X and Y being hydroxyl or X and Y together constituting an oxygen atom, are preferred. Many of these polymers are commercially available and others are simple derivatives of commercially available products, which can be readily prepared either prior to or simultaneously with the enzyme coupling reaction, or produced as a minor modification of the basic polymer after coupling. Such polymers containing the above-described EMA-type units are hereinafter referred to as an "EMA-type polymer."

Since enzyme molecules have an extremely high molecular weight, even if the polymeric units exemplified as usable for attachment of the enzyme occurs only once in a polymer chain, for example, once in every several hundred units, reaction of the enzyme with this unit will result in an enzyme-polymer product having substantial enzymatic activity and one wherein the enzyme moiety constitutes a substantial portion of the molecular weight of the polymeric enzyme product. If more than one of the exemplified units is present, multiple attachments can be achieved with increased enzymatic activity of the product. As pointed out hereinafter, preferably the units of the formula given are recurring, $n$ being at least 8. When the units are recurring, the symbols in the various recurring units do not necessarily stand for the same thing in all of the recurring units. Moreover, where the units are recurring, some of the X and Y groups may have meanings besides hydroxy or oxygen. For example, some, but not all, of them may be present in the form of imide groups, that is, groups in which X and Y together are —NR— or —N—W—(NR'R')$_x$ wherein R, W and R' have the values previously assigned.

A preferred type of polymeric material useful in the practice of the invention is the polymer of an olefinically unsaturated polycarboxylic acid or derivative with itself or in approximately equimolar proportions with at least one other monomer copolymerizable therewith. The polycarboxylic acid derivative can be of the nonvicinal type, including acrylic acid, acrylic anhydride, methacrylic acid, crotonic acid or their respective derivatives, including partial salts, amides and esters or of the vicinal type, including maleic, itaconic, citraconic, α, α-dimethyl maleic, α-butyl maleic, α-phenyl maleic, fumaric, aconitic, α-chloromaleic, α-bromomaleic, α-cyanomaleic acids including their partial salts, amides and esters. Anhydrides of any of the foregoing acids are advantageously employed.

Comonomers suitable for use with the above functional monomers include α-olefins such as ethylene, propylene, isobutylene, 1- or 2-butene, 1-hexene, 1-octene, 1-decene, 1-dodecene, 1-octadecene, and other vinyl monomers such as styrene, α-methyl styrene, vinyl toluene, vinyl acetate, vinyl amine, vinyl chloride, vinyl formate, vinyl propionate, vinyl alkyl ethers, e.g., methylvinylether, alkyl acrylates, alkyl methacrylates, acrylamides and alkylacrylamides, or mixtures of these monomers. Reactivity of some functional groups in the copolymers resulting from some of these monomers permits formation of other useful functional groups in the formed copolymer, including hydroxy, lactone, amine and lactam groups.

Any of the said polybasic acid derivatives may be copolymerized with any of the other monomers described above, and any other monomer which forms a copolymer with dibasic acid derivatives. The polybasic acid derivatives can be copolymers with a plurality of comonomers, in which case the total amount of the comonomers will preferably be about equimolar with respect to the polybasic acid derivatives. Although these copolymers can be prepared by direct polymerization of the various monomers, frequently they are more easily prepared by an afterreaction modification of an existing copolymer.

Copolymers of anhydrides and another monomer can be converted to carboxyl-containing copolymers by reaction with water, and to ammonium, alkali and alkaline earth metal and alkylamine salts thereof by reaction with alkali metal compounds, alkaline earth metal compounds, amines, or ammonia, either prior to, during, or subsequent to enzyme attachment, etc. Other suitable derivatives of the above polymers include the partial alkyl or other esters and partial amides, alkyl amides, dialkyl amides, phenylalkyl amides or phenyl amides prepared by reacting carboxyl groups on the polymer chain with the selected amines or alkyl or phenylalkyl alcohol as well as amino esters, amino amides, hydroxy amides and hydroxy esters, wherein the functional groups are separated by lower-alkylene, phenyl, phenylalkyl, phenylalkylphenyl, or alkylphenylalkyl, which are prepared in the same manner in each case with due consideration of preservation of enzyme attachment sites as previously stated. Other aryl groups may be present in place of phenyl groups. Particularly useful derivatives are those in which negatively charged carboxyl groups are partially replaced with amine or amine salt groups. These are formed by reaction with said carboxyls with polyamines such as dimethylaminopropylamine or dialkylaminoalcohols such as dimethylaminoethanol, the former forming an amide linkage with the polymer and the latter an ester linkage. Suitable selection of the above derivatives permit control of several parameters of performance for the enzyme-polymer product of the invention.

Representative dibasic acid or anhydride-olefin polymers, especially maleic acid or anhydride-olefin polymers, of the foregoing type (EMA type) are known, for example, from U.S. Pat. Nos. 2,378,629, 2,396,785, 3,157,595 and 3,340,680. Generally, the copolymers are prepared by reacting ethylene or other unsaturated monomer or mixtures thereof, as previously described, with the acid anhydride in the presence of a peroxide catalyst in an aliphatic or aromatic hydrocarbon solvent for the monomers but nonsolvent for the interpolymer formed. Suitable solvents include benzene, toluene, xylene, chlorinated benzene and the like. While benzoyl peroxide is usually the preferred catalyst, other peroxides such as acetyl peroxide, butyryl peroxide, ditertiary butyl peroxide, lauroyl peroxide and the like, or any of the numerous azo catalysts, are satisfactory since they are soluble in organic solvents. The copolymer preferably contains substantially equimolar quantities of the olefin residue and the anhydride residue. Generally, it will have a degree of polymerization of eight to 10,000, preferably about 100 to 5,000, and a molecular weight of about 1,000 to 1,000,000, preferably about 10,000 to 500,000. The properties of the polymer, such as molecular weight, for example, are regulated by proper choice of the catalyst and control of one or more of the variables such as ratio of reactants, temperature, and catalyst concentration or the addition of regulating chain transfer agents, such as diisopropyl benzene, propionic acid, alkyl aldehydes, or the like. The product is obtained in solid form and is recovered by filtration, centrifugation or the like. Removal of any residual or adherent solvent can be effected by evaporation using moderate heating. Numerous of these polymers are commercially available. Particularly valuable copolymers are those derived from ethylene and maleic anhydride in approximately equimolar proportions. The product is commercially available.

The maleic anhydride copolymers thus obtained have repeating anhydride linkages in the molecule, which are readily hydrolyzed by water to yield the acid form of the copolymer, rate of hydrolysis being proportional to temperature. In view of the fact that the coupling reactions of the present invention are carried out in aqueous solutions or suspensions, or using water-solvent mixtures, the product of the covalent bonding (coupling) of the enzyme to EMA has carboxyl or carboxylate groups attached to its chains adjacent the coupled enzyme instead of anhydride groups, due to hydrolysis of the anhydride groups, which do not react with the enzymes during the coupling reaction. The same is true of nonreacting anhydride groups present in other polymers, such as EMA-type polymers, which hydrolyze to carboxyl or carboxylate groups during the coupling reaction.

ENZYMES

The enzyme starting material may be obtained from any suitable source. It may comprise one or more of neutral and alkaline proteases, papain, aclepain, bromelin, bromelain, trypsin, chymotrypsin or the like. It may comprise an 7.25% but a lipase may be used instead of or in addition to the amylase. A carbohydrase, esterase, nuclease, or other type of hydrolase may be a starting enzyme reactant. A hydrase, oxidoreductase, or demolase may also be employed, or a transferase or isomerase, depending upon the ultimate activity and application intended. At any rate, whatever enzyme or enzyme mixture is employed as starting material according to the invention, it or they will be covalently bound into the water-soluble polymer-enzyme molecule.

A great many enzymes are known and are suitable for incorporation into the water-soluble polymer-enzyme products of the invention. Numerous starting enzymes are available commercially, being obtained from various animal, vegetable, and microbial sources. Many enzymes are obtained by microbial fermentation, e.g., production of enzymes by bacteria, using well-known fermentation methods such as those generally described in Kirk-Othmer, Encyclopedia of Chemical Technology 8, 173-204.

The exact activity of the enzyme or enzymes employed as starting material in the invention is not critical, providing only that the starting enzyme has the desired activity suitable for the ultimately intended use of the product. Various analytical methods are available to determine the activity of enzymes and enzymatically active materials, for example, the protease activity of proteolytic enzymes can be determined by well-known casein digestion methods. According to such tests, a protease catalyzes the hydrolysis of casein for a certain period of time and temperature and a certain pH; the reaction is stopped by the addition of trichloroacetic acid, and the solution is filtered. The color of the filtrate is developed by Folin phenol reagent, and the level of enzyme activity is measured spectrophotometrically in units of casein tyrosine. This method is more fully described in the Journal of General Physiology 30, 291 (1947) and in Methods of Enzymology 2, 33 by Academic Press, N.Y. (1955). Amylase activity is generally determined by the well-known dinitrosalicylic acid method of Bernfeld. Other tests are set forth hereinafter.

A particularly effective source of mixed enzymes which can be used as starting material in the present invention is a mutated Bacillus subtilis organism. The process for producing this organism and enzymes therefrom is described in U.S. Pat. No. 3,031,380. A culture of this Bacillus subtilis (strain AM) organism has been deposited with the U.S. Department of Agriculture, Agricultural Research Service, Northern Utilization Research and Development Division, 1815 North University Street, Peoria, Ill. 61604, and has been assigned No. NRRL B-3411. The enzymatically active material produced by this organism has been found generally to consist of two proteases, approximately 65-75 percent neutral protease (activity at pH of 7.0-7.5) and about 25-35 percent alkaline protease (activity at pH of 9 to 10). A significant amount of amylase is also present. There are generally about 700,000 to about 1,200,000 units of neutral protease activity per gram of isolated solids and about 250,000 to about 400,000 units of alkaline protease activity per gram as determined by Anson's variation of the Kunitz Casein digestion method. There are generally about 300,000 to 350,000 units of amylase activity per gram as determined by the Bernfeld method. As pointed out in the cited patent, the relative proportions of protease to amylase will vary depending on the exact conditions of growth of the micro-organism, but we have found that the neutral and alkaline protease and the amylase will be produced, in at least some amounts, almost regardless of changes in the culture medium and other conditions of growth of the micro-organism. The ratio of the activity of the alkaline protease to the activity of the neutral protease in the starting materials and in the polymer-enzymes product is preferably about 0.25 to 1.2 to one.

Another source of enzymes which can be used as starting material in accord with the present invention is B. subtilis strain NRRL 644, B. subtilis strain NRRL 941, and B. subtilis strain IAM 1523 (Japanese Culture Collection). Still other B. subtilis and other micro-organisms are available which produce protease, a mixture of proteases, or protease and amylase, at least to a limited if not optimum extent. The so-called Streptomyces griseus neutral protease has a broad pH activity range and may constitute one starting enzyme for incorporation into the products of the invention, as may the acid protease produced by Aspergillus oxyzae.

DESCRIPTION OF THE PREFERRED EMBODIMENTS

The following examples are given by way of illustration only, and are not to be construed as limited.

Experimental

The general procedure employed consisted of allowing cold solutions of enzymes in appropriate buffers to react overnight at 4° C. with cold, homogenized polymer, e.g., EMA, suspensions. EMA-21 was preferably employed, which had a molecular weight of ca. 20-30,000. Other molecular weight polymers may also be used. For example, EMA 11, having a molecular weight of about 2-3,000, and EMA 31, having a molecular weight of about 60,000, may also be employed. Separation of soluble and insoluble adducts, after reaction, was achieved by centrifugation in the cold (Sorval SS-3 centrifuge, ca. 10,000 r.p.m. and 10 min. centrifugation time). The soluble adducts were generally exhaustively dialyzed against water in the cold and then lyophilized. Insoluble adducts were washed (and centrifuged), usually 10 times with cold buffer and five times with cold distilled water and then lyophilized.

The reaction of the polymer with the plurality of enzymes, as in some of the examples, can obviously be carried out stepwise, one enzyme at a time, with or without intermediate isolation, or with all enzymes at once. The latter procedure is preferred for reasons of time, convenience, and economy.

EXAMPLES 1-3

Soluble EMA-Trypsin (SEMAT)

Trypsin (Worthington Biochemical Co.) was stored in the cold and was used as received. EMA-21 was converted completely to the anhydride by heating at 105° C. in vacuo to constant weight (ca. 15 hr.) and then stored in sealed containers until used. BAEE (benzoylarginine ethyl ester) was obtained from Mann Laboratories and used as received. RNase (bovine ribonuclease) was obtained from Worthington Biochemical Co. and used for the reported SEMAT digestion as received.

SEMAT

In a typical experiment 500 mg. trypsin was dissolved in 15 ml. of cold 0.2 M phosphate buffer, pH 7.5 and 1.00 g. of EMA was homogenized in a Waring blender for ca. 1 min. with 100 ml. cold phosphate buffer, pH 7.5. The solutions were combined and the mixture was stirred in a cold room (4° C.) for 12-15 hours. The mixture was then centrifuged in the cold for 10 min. at ca. 10,000 r.p.m. in a Sorvall SS-1 centrifuge.

The supernatant was separated from the sedimented, cross-linked Trypsin-EMA adduct (IMET) and the supernatant was exhaustively dialyzed against deionized water at 4° C., to remove phosphate ion. Lyophilization of the dialyzed material yielded the crude product. The ratio of soluble to insoluble adduct and the protein content of the adduct varies with the ratio of trypsin to EMA employed in the preparation (table 1).

SEMAT Purification

TABLE 1.—SEMAT PREPARATIONS

| SEMAT | Amount trypsin (mg.) | Amount EMA-21 (mg.) | Yield, crude (mg.) | Percent N [a] | Amount crude chromatographed [b] (mg.) | Yield product [b] (mg.) | Percent N [a] | Phosphate buffer, pH 7.5 M | Activity units/sec./ mg.[c] × $10^2$ |
|---|---|---|---|---|---|---|---|---|---|
| 1 | 254 | 509 | 509 | | | | | 0.2 | 3.14 |
| 1a | | | | | 105 | 52 | 3.50 | 0.2 | 3.95 |
| 2 | 500 | 1,000 | 291 | 2.83 | | | | 0.02 | Active |
| 2a | | | | | 101 | 35 | | 0.02 | Active |
| 3 | 250 | 501 | 203 | 8.36 | | | | 0.2 | |
| 3a | | | | | 102 | 40 | 3.86 | 0.2 | 3.16 |

[a] Based on dry weight.
[b] Crude product chromatographed on Sephadex G-100 (crosslinked dextran; phosphate buffer, pH 7.5); product taken from fractions at void volume.
[c] Activity using BAEE substrate (ca. 1.3–2.7×$10^{-4}$ M). Trypsin activity under comparable conditions corresponds to 1.6×$10^{-1}$ units/sec./mg. Assayed at pH 9.5 (carbonate/bicarbonate).

For general purification ca. 100 mg. of crude SEMAT dissolved in a minimum amount of 10 percent sucrose/0.2 M phosphate of buffer pH 7.5 and placed on a column (ca. 5×40 cm.) of Sephadex G-100 (cross-linked dextran) equilibrated with phosphate buffer, pH 7.5. Elution was followed in the usual manner and fractions were collected. The void volume eluant was collected, dialyzed and lyophilized to yield product SEMAT.

The integrity of the SEMAT was shown by chromatography of physical mixtures of trypsin and HEMA (hydrolyzed EMA) which gave a void volume fraction which had very low protein content as shown by UV absorption at 280 m$\mu$ vs 215 m$\mu$ and low nitrogen content (less than 0.2 percent). Disk gel electrophoresis toward both positive and negative poles did not give any migrating and stainable bands with purified SEMAT whereas a mixture of trypsin and HEMA gave a band with RF approximately identical with native trypsin. SEMAT gave a stain (Amido Schwarz dye) when added to the lower gel which was then polymerized and stained.

SEMAT Stability

SEMAT samples were dissolved in 0.2 M phosphate buffer or in 0.1 M KCl and allowed to stand in solution either at room temperature or in a refrigerator (ca. 4° C.). Trypsin solutions were prepared in similar solutions and subjected to identical conditions as for the SEMAT solutions.

Activity of the samples (SEMAT and trypsin) was made by determining their activities toward hydrolysis of BAEE as measured by the (zero order) rate of reaction. The solutions were initially adjusted to have approximately equal activities or activities based upon equivalent protein contents. Activity was measured as a function of time (days). In the case of a purified SEMAT preparation, 65 percent of the original (BAEE) activity was present after 17 days in solution at room temperature whereas a trypsin solution had less than 10 percent of the original (BAEE) activity after 8 days in solution at room temperature. In another example an unpurified SEMAT preparation retained ca. 60 percent of the original (BAEE) activity after 28 days in solution at room temperature.

Kinetic Parameters

The kinetic parameters, $K_m$ and $V_{max}$, for SEMAT and trypsin with BAEE as substrate are given in table 2.

pH Activity Profiles

Activity of SEMAT samples and trypsin were made by determining the rate of hydrolysis of BAEE as measured by the change in absorbance at 255 m$\mu$. (table 3).

TABLE 3

Soluble EMA/Trypsin Percent Maximum BAEE Activity vs. pH. (Tris Buffers to pH 9; Carbonate/Bicarbonate Buffers above pH 9)

| pH | Trypsin | SEMAT |
|---|---|---|
| 6.9 | 83 | 30 |
| 7.2 | 90 | 45 |
| 7.6 | 95 | 65 |
| 8.0 | — | 80 |
| 8.3 | 100 | 95 |
| 8.9 | — | 100 |
| 9.5 | 90 | 96 |
| 10.9 | 73 | 97 |

Unpredictably, the pH optimum of SEMAT extends into the higher pH ranges in contrast with native trypsin.

EXAMPLE 4

Chymotrypsin-EMA

To 240 ml. of cold 0.2 M phosphate buffer pH 7.3, was added 1.050 g. of EMA-21 and the mixture was homogenized for 1 minute. During this time, 210 mg. of chymotrypsin (crystalline) was dissolved in 60 ml. cold, distilled water. The two solutions were combined and magnetically stirred overnight in a cold room. The mixture was then centrifuged to separate soluble and insoluble systems and the two were then lyophilized overnight. The lyophilized soluble and insoluble systems were exhaustively dialyzed against cold water and dialyzed. Weight-soluble chymotrypsin/EMA (SEMAC), 1,441.82 mg. Weight-insoluble chymotrypsin/EMA (IEMAC), 792.11 mg.

Chromatography of SEMAC

Using the procedure described in example 1, 100 mg. of crude SEMAC was chromatographed on a Sephadex G-100 column, equilibrated with 0.2 M phosphate buffer, pH 7.5. Elution gave essentially two peaks, one centered near the void volume (206 ml.) and the other extending over a wide volume (ca. 250–350 ml.). The two peak eluates were collected separately, dialyzed against cold water and lyophilized. Weight fraction I, 17.60 mg.; Weight fraction II, 22.75 mg.

Assay of Chymotrypsin and SEMAC with ATEE (see infra)

ATEE activities of chymotrypsin and SEMAC (fraction I) were determined using 0.1 M phosphate buffer, pH 7.4. For assay 100 microliters ATEE (25 mg. in 1.25 ml. distilled acetonitrile) was added to 3 ml. of phosphate buffer. At zero time, 100 microliters of chymotrypsin solution (0.398 mg.

TABLE 2.—TRYPSIN AND SEMAT CATALYZED HYDROLYSIS OF BAEE

[pH 9.5 (0.1 M carbonate/bicarbonate)]

| | Enzyme M×$10^7$ | $S_0$(BAEE) M×$10^4$ | $K_m$ M×$10^5$ | $V_{max}$, mole/ sec.×$10^5$ |
|---|---|---|---|---|
| Trypsin | 0.655 | 9.284 | 1.84 | 1.06 |
| SEMAT [a], purified | 2.70 | 9.284 | 2.0 | 0.96 |
| SEMAT, unpurified | (b) | 9.284 | 1.80 | 0.69 |
| Trypsin, pH 8.0 [c] | | | 7.0 | 8 |

[a] Using 2.6×$10^{-4}$ g. SEMAT, assuming 24% protein as trypsin (3.89% N); Effective Enzyme=0.625×$10^{-4}$ g. protein.
[b] Using 2.6×$10^{-4}$ g. SEMAT unpurified.
[c] H. Neurath and G. W. Schwert, Chem. Rev. 46, 69 (1950).

NOTE.—From the Michaelis-Menten equation (see item c above), $S_0$ indicates initial substrate (BAEE) concentration, $K_m$ indicates the Michaelis-Menten constant, and $V_{max}$ indicates the maximum velocity.

chymotrypsin in 1 ml. phosphate buffer) or 100 microliters of SEMAC solution (12.750 mg. SEMAC in 1 ml. phosphate buffer) was added and the change in optical density at 237mμ as a function of time was recorded on a Cary Model 14 spectrophotometer. Chymotrypsin activity: 0.186 units/sec/100 microliters; SEMAC activity: 0.422 units/sec./100 microliters (units are arbitrary and are based upon change in optical density per unit time). This and other assays indicated that this SEMAC sample had approximately one thirty-second the activity of native chymotrypsin at this particular pH and ionic strength.

TABLE 4

Soluble EMA/Chymotrypsin ATEE percent maximum activity vs pH (Tris-HCl buffers from pH 6.8 to 9.4; tris buffer above pH 9.4)

% Maximum Activity (Arbitrary activity units)

| pH | Chymotrypsin | SEMAC |
| --- | --- | --- |
| 7.6 | 11 | 12 |
| 8.4 | 100 | 44 |
| 9.0 | — | 95 |
| 9.6 | 93 | 100 |
| 10.2 | 89 | 98 |

Unpredictably, the pH optimum of SEMAC extends into the higher pH ranges in contrast with native chymotrypsin.

Stability Studies on Chymotrypsin, Soluble EMA-Chymotrypsin and Insoluble EMA-Chymotrypsin Chymotrypsin (2.00 mg.), soluble EMA-chymotrypsin (60.02 mg.) and insoluble EMA-chymotrypsin (30.08 mg.) were each dissolved in 2 ml. of 0.2 M phosphate buffer, pH 7.5, and allowed to stand at room temperature. Esterase activities were measured over a period of days. Esterase activities were measured by determining the rate of hydrolysis of N-acetyl-L-tyrosine ethyl ester (ATEE) as determined by following the change in absorbance at 237 mμ of a solution as a function of time. For assay, 100 microliters of a solution of ATEE (40.06 mg. in 2 ml. acetonitrile) was added to 3 ml. of phosphate buffer and hydrolysis was initiated by addition of 10 microliters of the chymotrypsin or soluble EMA-chymotrypsin solutions and by addition of 25 gamma of the insoluble EMA-chmotrypsin. By this method, after 2 days at room temperature, chymotrypsin had 60 percent of its initial activity, the insoluble EMA-chymotrypsin had 97 percent of its initial activity, and the soluble EMA-chymotrypsin had 99 percent of its initial activity. After 7 days at room temperature, the soluble EMA-chymotrypsin solution had 93 percent of its initial esterase activity.

EXAMPLE 5

Lipase-EMA and Amylase-EMA

Lipase (MY-20, TM-Meito-Sangyo Co. Ltd., Tokyo, Japan) (251.32 mg., 25 ml. 0.2 M phosphate buffer) was added to homogenized EMA-21 (1 min. homogenization time) in the phosphate buffer (500.61 mg., 50 ml. buffer) and allowed to react overnight. After dialysis, lyophilization and isolation there was obtained 506.87 mg. soluble adduct and 111.18 mg. insoluble adduct.

Lipase Assay Procedure

The substrate for the assay was olive oil. An emulsion was prepared as follows: Polyvinyl alcohol (20 g.) (98 percent hydrolyzed; Matheson, Coleman and Bell) was stirred in 1 liter distilled water at 75° C. until dissolved, then cooled and neutralized to pH 7.0 with NaOH. Olive oil (10 ml.) and 90 ml. polyvinyl alcohol solution were homogenized in a Waring Blendor for 5 minutes and then the pH was adjusted to 7.0 with N/1 NaOH. A fresh suspension was prepared every day. The enzyme assay was carried out using the Radiometer pH-stat. This equipment comprised a No. 25 pH meter, a No. 11 titrator, a ABU1b auto burette and a SBR2c titrigraph. The volume of the burette was 0.25 ml. Olive oil emulsion (3 ml.) was placed in the titration vessel at room temperature. The reaction was generally initiated by addition of 0.25 ml. of lipase or lipase/EMA solution (2–4 mg./ml.) and the rate of base uptake (0.01 N NaOH) required to maintain the pH at a constant value was measured. A stream of $CO_2$-free nitrogen gas was used to flush $CO_2$ from the reaction chamber and a magnetic stirrer was used to ensure adequate mixing of the system. The rate of hydrolysis was measured from the linear portion of the titration graph and expressed as μ moles fatty acid liberated per minute per mg. enzyme.

Assay of samples:

| Sample | pH 7 | pH 6 |
| --- | --- | --- |
| Lipase* | 0.48 | 0.20/0.22 |
| Soluble EMA/Lipase* | | 0.003 |
| Insoluble EMA/Lipase* | 2.0–4.0♦ | 2.2/2.7 |

*Weight based upon protein with lipase; total weight sample for lipase/EMA systems.

♦Assay values ranged from 2–4 moles/min./mg. for several samples. The values were reproducible, however, within a given sample. No explanation can be given for this anomaly.

An advantageous purification of the crude enzyme which frequently occurs during covalent bonding of an enzyme to a polymer molecule accounts for the high activity of the insolubles.

pH Profile of Lipase and Insoluble Lipase/EMA

Lipase activities were determined for lipase and insoluble lipase/EMA using the olive oil emulsion. The pH of the emulsion was adjusted immediately prior to use by addition of 0.1 or 0.01 M sodium hydroxide. The same emulsion, at appropriate pH, was used for both the lipase and lipase/EMA. A correction for spontaneous base-catalyzed hydrolysis was made at the higher pH values by taking initial slopes and subtracting this value from the zero-order enzyme catalyzed reaction. Results are tabulated in table 5.

In exactly the manner of the foregoing example, amylase-EMA is prepared using bacterial amylase from B. subtilis AM and EMA-21. In replicate experiments, the amylolytic activity of the soluble and insoluble EMA-amylase products varies between 44 and 72 percent of that of the parent native enzyme.

TABLE 5

Lipase Activity vs pH (activity in mmoles/min./mg. × $10^3$)

| pH | Lipase | Insoluble Lipase-EMA |
| --- | --- | --- |
| 6 | 0.23* | 2.7* |
| | 0.21 | 2.2 |
| 7 | 1.5 | 5.3 |
| | 1.9 | 5.3 |
| 8 | 2.9 | 5.6 |
| | 2.9 | 5.5 |
| 9 | 2.9 | 5.4 |
| | 2.9 | 5.3 |
| 10 | 2.2 | 3.8 |
| | 2.0 | 3.9 |

*Assays run in duplicate.

EXAMPLE 5

Cellulase-EMA

Cellulase (Cellosin AP, TM-Nomoto Co., Japan) (4.001 g. added to 60 ml. cold water, with incomplete dissolution) was added to a suspension of EMA-21 (1.001 g. with 240 ml. cold 0.2 M phosphate buffer, pH 7.48 homogenized for 1 minute) and the mixture stirred overnight at 4° C. The mixture was centrifuged and the supernatant and insoluble materials were dialyzed exhaustively against water, and lyophilized. Weight-soluble cellulase/EMA, 0.9997 g.; weight-insoluble cellulase-EMA, 1.8786 g.

Cellulase Assay Procedure

The assay procedure was essentially that of Worthington Biochemical Corp. Freehold, N.J. and determines the amount of glucose liberated per unit time as measured by the Glucostat (reagent kit for glucose assay) system (Worthington Biochemical Corp.).

Enzyme solution a weighted amount of cellulase or cellulase/EMA was added to 0.05 M sodium acetate and stirred and diluted as required.

Substrate solution

A ca. 1.2 percent carboxymethylcellulose solution (1.200 g., Cellulose Gum, Type 70 Premium, medium, Hercules Powder Co.) was prepared by dissolution in 80 ml. hot 0.05 M citrate buffer, pH 3.5. After dissolution the solution was cooled and the volume adjusted to 100 ml. The final pH was ca. 4.

Standard solution

An aqueous solution was prepared such that the concentration of D-glucose was ca. 0.05-0.3 mg./ml.

Glucostat solution

The contents of the Chromagen (color developer) vial were dissolved in distilled water and the volume adjusted to 60 ml. The content of the Glucostat vial was dissolved in the solution and the volume adjusted to 90 ml.

Assay

Test solutions were made by taking 1 ml. of the enzyme solution and adding to 10 ml. of substrate. From each solution 1 ml. was taken. Standard solutions were 1 ml. aliquots of the glucose solutions. To the reaction mixtures was added 9 ml. of the Glucostat reagent. The reaction was allowed to proceed for 1 hr. at room temperature and the reaction was then stopped by addition of one drop of 4 N HCl. After 10 minutes the optical density of the solutions were read at 400 m$\mu$ using a reagent blank.

|  | Activity g. glucose/hr./mg. enzyme system |
|---|---|
| Cellulosin-AP (commercial cellulase) | 0.048 |
| Insoluble cellulase/EMA | 0.014 |
| Soluble cellulase/EMA | 0.157 |

This result is due to a purification of the crude enzyme by attachment to the polymer, which accounts for the high activity of the solubles.

EXAMPLE 7

B. subtilis Neutral and Alkaline Protease-EMA Insoluble and Soluble Adducts

B. subtilis alkaline and neutral proteases (200 mg.) are dissolved in 50 ml. cold 0.1 M in phosphate and 0.01 M in calcium acetate, pH 7.5, and this solution is then added to a cold, homogenized mixture of EMA-21 (100 mg.) suspended in 50 ml. 0.1 M phosphate pH 7.5. The mixture is stirred overnight in the cold (4° C.) and the insoluble material is separated from the supernatant by centrifugation. After washing the solids five times with cold 0.1 M NaCl and twice with water, the material is lyophilized to yield a solid which possesses 38 percent of neutral protease activity and 52 percent of the original alkaline protease activity.

The supernatant solution is dialyzed against cold, distilled water and then lyophilized to yield a soluble solid which possesses 47 percent of the neutral protease activity and 59 percent of the original alkaline protease activity.

The ratio of the alkaline protease activity to the neutral protease activity in the starting material and in the polymer-enzyme product is preferably about 0.25-1.2 to 1.

EXAMPLE 8

B. subtilis Neutral and Alkaline Protease and Lipase-EMA Insoluble and Soluble Adducts.

B. subtilis neutral and alkaline proteases (400 mg.) and Lipase (400 mg., Lipase-MY Meito-Sangyo Co., Japan) are dissolved in 300 m. cold 0.2 M in phosphate and 0.01 M in calcium acetate, ph 7.5, and this solution is added to a cold, homogenized mixture of EMA-21 (200 mg.) suspended in 100 ml. of 0.1 M phosphate, pH 7.5. The mixture is stirred overnight in the cold (4° C.) and the supernatant is separated from the insoluble material by centrifugation. After washing the solid with 0.1 M NaCl and water followed by lyophilization there is obtained a solid which possesses 35 percent of the neutral protease activity, 47 percent of the alkaline protease activity, and 72 percent of the original lipase activity.

Dialysis of the supernatant against cold, distilled water followed by lyophilization yields a soluble solid which possesses 43 percent of the neutral protease activity, 56 percent of the alkaline protease activity, and 17 percent of the original lipase activity.

EXAMPLE 9

Oxynitrilase-EMA

Oxynitrilase was isolated from bitter almonds (Tri-Co Almond Co., Chico, Calif.) according to the procedure of Pfeil and Becker, J. Am. Chem. Soc. 88, 4299 (1966). The crude enzyme obtained by ethanol precipitation was rechromatographed on Sephadex (cross-linked dextran) prior to use. In 150 ml. cold 0.2 M phosphate buffer pH 7.5, was dissolved 307.60 mg. oxynitrilase. EMA-21 (613.12 mg.) was homogenized in a blender for 1 min. with 60 ml. cold phosphate buffer. To the EMA-21 homogenate was added 10 ml. of 1 percent hexamethylene diamine in water and the mixture was stirred for 2 min., after which time the oxynitrilase solution was added and the mixture was stirred overnight at 4° C. The mixture was then centrifuged to separate supernatant from the solids. The solids were washed five times with cold phosphate buffer and then eight times with cold water. The solids and the supernatant were then dialyzed and lyophilized. Weight soluble oxynitrilase-EMA: 428 mg.; weight-insoluble oxynitrilase-EMA: 838.07 mg.

Anal: Insoluble oxynitrilase-EMA: %N, 3.60; 3.68.

Assay of Insoluble Oxynitrilase-EMA

Activities were determined by following optical rotation as a function of time using a Perkin-Elmer model 141 Polarimeter, with a 1 decimeter cell; at the D-line of sodium.

1. Crotonaldehyde/Sodium Cyanide: To 5 ml. of a solution of sodium cyanide (7.6 g. in 250 ml. distilled water) adjusted to pH 5.4 with 6 N acetic acid, was added 1 ml. of a water slurry of oxynitrilase-EMA (10 mg. per 2 ml.). At zero time 5 ml. of a crotonaldehyde solution (7 g. in 250 ml. distilled water) was added and the mixture stirred for a few minutes prior to recording of optical rotation.

After 5 minutes the optical rotation was $\alpha]_D$–0.048 which indicates the oxynitrilase-EMA is catalyzing the formation of the optically active cyanhydrin of crotonaldehyde.

2. DL-Mandelonitrile: In 200 ml. 50 percent methanol/0.05 M sodium acetate, adjusted to an apparent pH 5.3 with 6 N acetic acid, was dissolved 11.0 g. DL-mandelonitrile. The system was maintained under a nitrogen purge to prevent formation of benzoic acid from benzaldehyde. At zero time 211.07 mg. of insoluble oxynitrilase-EMA was added and after brief stirring an aliquot was removed and optical rotation was recorded.

After 2 minutes the optical rotation was $\alpha]_D$–0.012; after 3 minutes it was $\alpha]_D$–0.045; after 5 minutes $\alpha]_D$–0.066, which indicates the oxynitrilase-EMA is catalytically converting D-mandelonitrile to benzaldehyde plus hydrogen cyanide while the L-mandelonitrile remains essentially unchanged.

3. Crotonaldehyde/Hydrogen Cyanide: Freshly distilled hydrogen cyanide (15 ml.) was dissolved in 500 ml. of cold water. Crotonaldehyde (1.408 g.) was dissolved in 100 ml. of cold water (0.2 M). To 5 ml. of the crotonaldehyde solution was added 11.20 mg. of oxynitrilase-EMA. At zero time 5 ml. of the hydrogen cyanide solution was added, the mixture was stirred briefly and the optical rotation was then recorded.

After 2 minutes the optical rotation was $\alpha]_D$–0.006; after 4 minutes, $\alpha]_D$–0.059; after 10 minutes $\alpha]_D$–0.204, which indicates the oxynitrilase-EMA is catalyzing the formation of the optically active cyanhydrin of crotonaldehyde.

4. Glycolaldehyde/Hydrogen Cyanide: Glycolaldehyde (1.206 g., K and K Laboratories) was dissolved in 100 ml. water (0.2 M). To 5 ml. of this solution was added 10.47 mg. oxynitrilase-EMA. At zero time, 5 ml. of the above hydrogen cyanide solution was added and, after brief stirring, the optical rotation was recorded.

After 2 minutes the optical rotation was $\alpha]_D$–0.009; after 4 minutes, $\alpha]_D$–0.055; after 7 minutes $\alpha]_D$–0.117, which indicates the oxynitrilase-EMA is catalyzing the formation of the optically active cyanhydrin of glycolaldehyde.

Assay of Soluble EMA-Oxynitrilase

In 2 ml. distilled water was dissolved 10 mg. soluble EMA-oxynitrilase. In 125 ml. water was dissolved 3.5 g. crotonaldehyde. In 125 ml. cold water was dissolved 3.8 g. sodium cyanide and the pH was adjusted to 5.4 with 6 N acetic acid. To 5 ml. of the cyanide solution was added 1 ml. of the soluble EMA-oxynitrilase solution. At zero time 5 ml. of the crotonaldehyde solution was added to the mixture and the rotation (in negative millidegrees) was followed as a function of time (min.) in a Perkin-Elmer model 141 polarimeter using a one decimeter quartz cell. At 2 min.$\alpha]_D$–0.272; 5 min. $\alpha]_D$–0.317; 10 min. $\alpha]_D$–0.371, showing that the soluble EMA-oxynitrilase product possesses the enzymatic activity of the native enzyme in conversion of HCN and crotonaldehyde to an optically active crotonaldehyde cyanohydrin.

EXAMPLE 10

Asparaginase-EMA

Asparaginase (Worthington, 20 units/mg., minimum) (13.55 mg.) was dissolved in 10 ml. cold 0.2 M phosphate buffer, pH 7.5. EMA-21 (50.28 mg.) was homogenized for 45 sec. with 50 ml. phosphate buffer, added (with an additional 15 ml. cold buffer) to 0.5 ml. 1 percent hexamethylenediamine and stirred for 45 sec., at which time the cold asparaginase solution was added and the mixture was stirred overnight at 4° C. Workup in the usual manner of centrifugation, dialysis and lyophilization gave the soluble and insoluble systems. Weight of soluble asparaginase-EMA: 25.29 mg.; weight of insoluble asparaginase-EMA: 57.55 mg.

Asparaginase Assay Procedure

The procedure of Worthington Biochemical Corp. was employed. Enzyme and EMA soluble and insoluble concentrations were 1 mg./1 ml. physiological saline. L-Asparagine substrate was 0.01 M in 0.05 M tris-HC1 [tris(hydroxymethylaminomethane)hydrochloride] buffer, pH 8.6. A solution consisting of 1.7 ml. substrate and 0.2 ml. tris-HC1 buffer were incubated at 37° C. At zero time, 0.1 ml. enzyme or enzyme/EMA solution was added and the mixture was incubated at 37° C. for 10 min. At the end of this time 0.1 ml. 1.5 M trichloroacetic acid was added, the mixture centrifuged, and 0.5 ml. of the supernatant was added to 7.0 ml. water followed by 1.0 ml. Nessler's reagent. After 10 min. absorbance was read at 480 m$\mu$. A control was a sample which the trichloroacetic acid was added to the substrate prior to enzyme addition. Standards were ammonium sulfate solutions that contained 0.5 to 0.1 $\mu$mole nitrogen per 0.5 ml.

Assay pH 8.6

Asparaginase—71 units/mg. protein. Insoluble Asparaginase—EMA 1.5 units/mg. total weight. Soluble Asparaginase—EMA 27 units/mg. total weight.

Anal: soluble asparaginase/EMA contained 5.48% N, dry weight.

EXAMPLES 11 and 12

Pepsin-EMA

A. 1:1 weight ratio, pepsin:EMA: In 150 cold 0.2 M acetate buffer, pH 5.0, was dissolved 201.03 mg. pepsin (Sigma Chemicals; 1:60,000). This solution was added to a mixture of 203.41 mg. EMA-21 in 50 ml. cold buffer which had been homogenized for 1 min. The combined solutions were stirred overnight at 4° C. The supernatant and solids were separated by centrifugation, the supernatant dialyzed against cold, distilled water and the solid material washed twice with cold water and then dialyzed overnight. The supernatant and solid fractions were then lyophilized to give 129.35 mg. soluble pepsin-EMA (7.25% N, dry weight) and 32.20 mg. insoluble pepsin-EMA (1.16% N, dry weight). (Washing the solids with buffer sodium chloride solutions resulted in what appeared to be disperse gels.)

B. 4:1 weight ratio, pepsin: EMA: Using the same procedure as above, 403.38 mg. pepsin in 100 ml. cold 0.05 M acetate buffer was allowed to react with 101.21 mg. EMA homogenized with 125 ml. cold acetate buffer. The solid isolated after contrifugation was washed twice with water followed by dialysis, as was the supernatant. Lyophilization of the two fractions gave 226.39 mg. soluble pepsin-EMA (12.2% N, dry weight) and 68.11 mg. of insoluble pepsin-EMA (0.32% N, dry weight).

Assay Procedure

Hemoglobin (2.5 g.) was added to 100 ml. distilled water and homogenized for 30 sec. and then filtered through glass wool. The pH was adjusted by addition of the appropriate buffer. Assay of the pepsin and pepsin-EMA systems then proceeded according to the procedure of Worthington Biochemical Corp. whereby the hydrolysis of hemoglobin is measured per unit time at 37° C. as determined by the optical density at 280 m$\mu$ of the trichloroacetic acid soluble materials. Activities are expressed in units/mg. weight pepsin or pepsin-EMA. (One unit corresponds to a 280 m$\mu$ absorbancy of TCA-soluble hydrolysis products of 0.001 per minute at 37°).

pH Profile-Activity

Assays were based upon hemoglobin activities as a function of pH. Buffers employed were HC1-KC1 from pH 1.0–3.11 (I=0.10) and sodium acetate from pH 3.60–5.8 (I=0.05).

TABLE 6

Pepsin-EMA Derivatives/pH Profiles

% Maximum Activity (Hemoglobin Assay)

| pH* | Pepsin | Soluble EMA-pepsin (7.25% N) | Insol. EMA-Pepsin (0.35% N) |
|---|---|---|---|
| 1.0 | 15 | 16 | – |
| 1.4 | 15 | 29 | – |
| 1.8 | 77 | 84 | – |
| 2.2 | 84 | 87 | 38 |
| 2.4 | 100 | 100 | 92 |
| 3.1 | 48 | 16 | 100 |
| 3.6 | 9 | 2 | 25 |
| 4.0 | 3 | 2 | 1 |
| 4.6 | 1 | 1 | – |
| 5.0 | – | – | – |
| 5.8 | – | – | – |

*Buffers employed: HC1-KC1 (I=0.10) from pH 1.0–3.1; sodium acetate (I=0.05) from pH 3.6–5.8.

EXAMPLE 13

Water-soluble EMA-Papain, Mercuri and Zinc Papain A. Soluble EMA-Mercuri and Zinc Papain In 50 ml. of cold 0.01 M phosphate buffer, pH 7.0, containing 0.002 M in cysteine, is dissolved 250 mg. commercial Hgpapain. To this solution is added a homogenized mixture of EMA-21 (200 mg. EMA in 100 ml. cold 0.01 M phosphate, pH 7.0, containing 0.002 M cysteine). The mixture is stirred overnight in the cold (4° C.) and then centrifuged for 10 min. (8,000 r.p.m. to separate insoluble materials. The supernatant solution is then exhaustively dialyzed against cold water which is 0.002 M in cysteine. Lyophilization of the dialyzed material gives an aqueous soluble product which possesses 65 percent of the protease activity (after the mercury is removed in the Anson variation of the Kunitz casein test method J. Gen. Physiol. 30, 291 (1947), employing EDTA (ethylene diamine tetraacetic acid) in the presence of crysteine).

In the same manner, the water-soluble EMA-zinc papain is prepared from EMA- and zinc-papain (U.S. Pat. No. 3,284,316) and found to have 40 percent of the initial protease activity after removal of the zinc; 10 percent before removal of zinc.

B. Soluble EMA-Papain

In 25 ml. cold 0.01 M phosphate buffer, pH 7.0, which is 0.002 M in cysteine, is dissolved 100 mg. of crude papain. To this cold solution is added an homogenized mixture of 100 mg. EMA-21 in 100 ml. cold 0.01 M phosphate, pH 7.0 which is 0.002 M in cysteine. The mixture is stirred overnight in the cold (4° C.), centrifuged, and the supernatant is exhaustively dialyzed against cold 0.002 M cysteine. Lyophilization of the dialyzed material gives an aqueously soluble EMA-papain product which possesses 15 percent of the protease activity.

EXAMPLE 14

Lipase-Styrene Maleic Anhydride Copolymers

Coupling of bacterial lipase to an alternating styrene-maleic anhydride (1:1) copolymer, in aqueous buffer medium using the conventional procedure of examples 1 to 12 at carrier to enzyme ratios of 1:15 to 3:1, yields soluble polymer-lipase derivatives having up to about 20 percent of the original enzymatic activity.

EXAMPLE 15

Cellulase/Protease-Vinyl Methyl Ether/Maleic Anhydride Copolymers

Coupling of bacterial cellulase plus B. subtilis AM neutral and alkaline bacterial proteases to an alternating vinyl methyl ether-maleic anhydride (1:1) copolymer, in aqueous buffer medium using the conventional procedure of examples 1 to 12 at carrier to enzyme ratios of 1:15 to 3:1, yields soluble polymer-cellulase/neutral protease/alkaline protease derivatives having up to about 50 percent of each of the original enzymic activities.

EXAMPLE 16

Cellulase-Vinyl Acetate/Maleic Anhydride Copolymers

Coupling of bacterial cellulase to an alternating vinyl acetate-maleic anhydride (1:1) copolymer, in aqueous buffer medium using the conventional procedure of examples 1 to 12 at carrier to enzyme ratios of 1:15 to 3:1, yields soluble polymer-cellulase derivatives having up to about 60 percent of each of the original enzymic activities.

EXAMPLE 17

Cellulase/Lipase/Protease-Divinyl Ether/Maleic Anhydride Cyclocopolymers

Coupling of bacterial cellulase, lipase, and alkaline protease to a divinyl ether-maleic anhydride cyclocopolymer (having repeating units consisting of adjacent ethylene-maleic anhydride segments which are additionally bonded to each other by ether linkage), in aqueous buffer medium using the conventional procedure of examples 1 to 12 at carrier to enzyme ratios of 1:15 to 3:1, yields soluble polymer-cellulase/lipase/protease derivatives having up to about 50 percent of each of the original enzymic activities.

EXAMPLE 18

Chymotrypsin-Polymaleic Anhydride Polymers

Coupling of chymotrypsin to a polymaleic anhydride polymer, in aqueous buffer medium using the conventional procedure of examples 1 to 12 at carrier to enzyme ratios of 1:15 to 3:1, yields soluble polymer-chymotrypsin derivatives having up to about 70 percent of the original enzymic activity.

EXAMPLE 19

Trypsin-Polymaleic Anhydride Polymers

Coupling of trypsin to a polymaleic anhydride polymer, in aqueous buffer medium using the conventional procedure of examples 1 to 12 at carrier to enzyme ratios of 1:15 to 3:1, yields soluble polymer-trypsin derivatives having up to about 70 percent of the original enzymic activity.

EXAMPLE 20

Protease-Polymaleic Anhydride Polymers

Coupling of a mixture of alkaline and neutral proteases produced by B. subtilis to a polymaleic anhydride polymer, in aqueous buffer medium using the conventional procedure of examples 1 to 12 at carrier to enzyme ratios of 1:15 to 3:1, yields soluble polymer-alkaline protease/neutral protease derivatives having up to about 70 percent of the original enzymic activities.

EXAMPLE 21

Acid Protease-Polyacrylic Anhydride and EMA Polymers

Coupling of acid protease produced by Aspergillus oryzae to a polyacrylic anhydride polymer, in aqueous buffer medium using the conventional procedure of examples 1 to 12 at carrier to enzyme ratios of 1:15 to 3:1, yields soluble polymer-protease derivatives having up to about 50 percent of the original enzymic activity.

In the same manner, the identical enzyme-polymer product is produced from polyacrylic acid, using Woodward's reagent, N-ethyl-S-phenyl isooxazolium-3'-sulfonate, as activator for the carboxyl groups of the polyacrylic acid.

Moreover, direct reaction of the acid protease from A. oryzae with EMA-21 in the manner of examples 1 to 12 produces soluble EMA-acid protease having an exceptional activity at acid pH's, the percentage of acid proteolytic activity based upon starting native acid protease varying between about 23 and 68 percent.

EXAMPLE 22

B. subtilis Neutral and Alkaline Proteases and Amylase/EMA Insoluble and Soluble Adducts.

B. subtilis neutral and alkaline proteases and amylase mixture (250 mg.) is dissolved in 100 ml. cold 0.1 M in phosphate and 0.01 M in calcium acetate, pH 7.5, and to this solution is added a homogenized mixture of EMA-21 (200 mg.) suspended in 50 ml. cold 0.1 M phosphate, pH 7.5. The mixture is stirred overnight in the cold (4° C.) and the insoluble material is separated from the supernatant by centrifugation. After washing the solids five times with cold 0.1 M NaCl and twice with water, the material is lyophilized to yield a solid which possesses 32 percent of the original neutral protease activity, 48 percent of the original alkaline protease activity, and 62 percent of the original amylase activity.

The supernatant solution is dialyzed against cold, distilled water and then lyophilized to yield a soluble solid which possesses 42 percent of the original neutral protease activity, 57 percent of the original alkaline protease activity, and 69 percent of the original amylase activity.

The ratio of the activity of the alkaline protease to the activity of the neutral protease in the starting materials and in the polymer-enzyme products is preferably about 0.25 to 1.2 to 1.

EXAMPLE 23

Bacillus subtilis Neutral Protease and Dextranase-EMA Soluble and Insoluble Products B. subtilis neutral protease (100 mg.) and dextranase (100 mg.) are dissolved in 75 ml. cold 0.1 M phosphate buffer, pH 7.5, which is also 0.01 M in calcium acetate. To this solution is added a homogenized mixture of EMA-21(250 mg.) in 100 ml. cold 0.1 M phosphate buffer, pH 7.5. The combined mixture is stirred overnight in the cold (4° C.) and the solid is separated from the supernatant solution by centrifugation. After dialysis and lyophilization the insoluble *B. subtilis* neutral protease and dextranase-EMA product possesses 43 percent of the original protease activity and 27 percent of the original dextranase activity.

The supernatant solution is dialyzed and lyophilized to yield a soluble solid *B. subtilis* neutral protease and dextranase-EMA product which possesses 64 percent of the original protease activity and 62 percent of the original dextranase activity.

EXAMPLE 24

Dextranase-EMA Soluble and Insoluble Products.

Dextranase was obtained as a solid precipitated by organic solvent addition to a fermentation beer of *Penicillium funiculosum* (strain NRRL 1132).

Dextranase (100 mg.) is dissolved in 50 ml. cold 0.1 M phosphate buffer, pH 7.5. which is 0.01 M in calcium acetate. To this solution is added a homogenized mixture of EMA-21 (100 mg.) in 50 ml. cold 0.1 M phosphate buffer. The combined mixture is stirred overnight in the cold (4° C.) and the solid is separated from the supernatant solution by centrifugation. After dialysis and lyophilization the insoluble dextranase-EMA product possesses 35 percent of the original dextranase activity.

The supernatant solution is dialyzed and lyophilized to yield a soluble solid dextranase-EMA product which possesses 68 percent of the original dextranase activity.

EXAMPLE 25

*B. subtilis* Neutral and Alkaline Proteases and Amylase/D-MAPAI-EMA

The partial dimethylaminopropylamine imide of EMA-21 was prepared by refluxing a mixture of EMA and a limiting amount (50 percent by weight) of N,N-dimethylaminopropylamine in xylene for 5 hours. During this time water was removed using a Dean-StarK trap. After water evolution had ceased, indicating completion of the reaction, the product was isolated by precipitation with hexane and drying in vacuo at 105° C. The imide product contained 8.9% N, indicating an imide content of 54 percent.

The *B. subtilis* AM neutral and alkaline protease and amylase mixture (500 mg.) is dissolved in 50 ml. cold 0.1 M phosphate buffer, pH 7.5, which is also 0.02 M in calcium acetate. To this solution is added a cold mixture of the DMAPAI-EMA (500 mg.) which is homogenized for 1 minute with 50 ml. cold 0.1 M phosphate buffer, pH 7.5. The combined mixture is stirred overnight in the cold (4° C.). The insoluble product is separated from the supernatant by centrifugation and then washed eight times with 0.1 M NaCl and five times with water and then lyophilized. The insoluble enzyme-polymer product thus obtained possesses 36 percent of the original neutral protease activity, 42 percent of the original alkaline protease activity, and 52 percent of the original amylase activity.

The supernatant solution is dialyzed against water and lyophilized to yield the soluble enzyme-polymer product which possesses 46 percent of the original neutral protease activity, 48 percent of the original alkaline protease activity, and 50 percent of the original amylase activity.

The ratio of the activity of the alkaline protease to the activity of the neutral protease in the starting materials and in the cationic polymer-enzyme product is preferably no greater than about 0.25 to 1.2 to 1.

EXAMPLE 26

Trypsin/DMAPAI-EMA

The partial dimethylaminopropylamine imide of EMA-21 was prepared by refluxing a mixture of EMA and a limiting amount (50 percent by weight) of N,N-dimethylaminopropylamine in xylene for 5 hours. During this time water was removed using a Dean-Stark trap. After water evolution had ceased, indicating completion of the reaction, the product, was isolated by precipitation with hexane and drying in vacuo at 105° C. The imide product contained 8.9% N, indicating an imide content of 54 percent.

Trypsin (250 mg.) is dissolved in 100 ml. cold 0.1 M phosphate buffer, pH 7.5, and to this solution is added a mixture of the DMAPAI-EMA (250 mg.) which is homogenized for 1 minute with 100 ml. cold 0.1 M phosphate buffer, pH 7.5. The combined mixture is stirred overnight in the cold (4° C.) and the insoluble polymer-enzyme product is separated from the supernatant solution by centrifugation. After washing eight times with 0.1 M NaCl and five times with water, the soluble polymer-enzyme product is obtained by lyophilization and possesses 55 percent of the original trypsin activity as measured at pH 7.5.

The supernatant solution is dialyzed against water and lyophilized to yield a soluble polymer-enzyme product which possesses 65 percent of the original trypsin activity as measured at pH 7.5.

The soluble trypsin-polymer product and insoluble trypsin-polymer product both possess greater enzymatic activities at lower pH ranges as compared with the native enzyme.

EXAMPLE 27

Asparaginase/DMAPAI-EMA

The partial dimethylaminopropylamine imide of EMA-21 was prepared by refluxing a mixture of EMA and a limiting amount (50 percent by weight) of N,N-dimethylaminopropylamine in xylene for 5 hours. During this time water was removed using a Dean-Stark trap. After water evolution had ceased, indicating completion of the reaction, the product was isolated by precipitation with hexane and drying in vacuo at 105 ° C. The imide product contained 8.9% N, indicating an imide content of 54 percent.

Asparaginase (34 mg.) is dissolved in 30 ml. cold 0.1 M phosphate buffer, pH 7.5, and to this solution is added a mixture of the DMAPAI-EMA (45 mg.) which is homogenized for 1 minute with 30 ml. cold 0.1 M phosphate buffer, pH 7.5. The combined mixture is stirred overnight in the cold (4° C.) and the insoluble polymer-enzyme product is separated from the supernatant solution by centrifugation. After washing eight times with 0.1 M NaCl and five times with water the insoluble polymer-enzyme product is obtained by lyophilization and possesses 11 percent of the original asparaginase activity.

The supernatant solution is dialyzed against water and lyophilized to yield a soluble polymer-enzyme product which possesses 36 percent of the original asparaginase activity.

Other N,N-dilower-alkylaminolower-alkylamines are employed to produce corresponding additional trypsin or neutral and alkaline protease and amylase or asparaginase/dilower-alkylaminolower-alkylimide/EMA products as the case may be, depending on the enzyme or enzyme mixture employed.

Further, for preparation of water-soluble cationic polymer-enzyme products, polymers having such groups present in the molecule are employed, as already illustrated.

Partial imides of a starting carboxyl or carboxylic acid anhydride containing polymer, e.g., EMA, are produced by:

A. Heating a limiting amount of a secondary or tertiary aminolower-alkylamine with a water solution of the hydrolyzed or carboxyl-containing form of the polymer in vacuo at a temperature of about 140°–150° C. until a constant weight has been reached and water is no longer given off. Such a reaction simultaneously results in formation of imide groups and reformation of the anhydride groups. In this manner imide-polymer products are formed which possess 5–95 percent imide linkages, the remaining carboxyl groups (i.e., 95–5 percent, respectively) being present in the polymer as anhydride groups, the exact proportions being dependent upon the relative amounts of starting amine and polymer.

B. Alternatively, a partial amide-polymer product may be converted to the partial imide-polymer product by heating a partial amide-polymer product in vacuo at 140°–150° C. until water is no longer given off. Such an imide-polymer product likewise possesses comparable proportions of imide and anhydride groups depending upon the number of amide groups originally contained in the starting partial amide-polymer product.

Partial secondary and tertiary aminolower-alkylamides of the starting carboxyl or carboxylic acid anhydride containing polymer, e.g., EMA, are obtained by contacting the polymer with a limiting amount of the selected amine in suspension in a solvent such as benzene or hexane, resulting in formation of a partial amide-anhydride derivative of the polymer, or a corresponding amide-carboxylate product thereof. The number of amide groups is dependent upon the quantity of the amine used as compared with the quantity of polymer employed. Such amide-polymer products possess 5–95 percent amide groups, with remaining carboxyl groups being present as anhydride groups.

Partial aminoester-polymer products are most conveniently prepared by heating at reflux temperatures overnight a limiting quantity of the selected aminoalcohol and carboxyl or carboxylic acid anhydride containing polymer, e.g., EMA, in a dry organic solvent such as toluene or dimethylformamide. The resulting product contains ester groups, carboxylic acid groups and anhydride groups, the respective numbers of which are determined by the quantity of aminoalcohol used in relation to the amount of polymer employed. Suitable blocking and unblocking of the amine moiety may be effected when required.

These products are reacted with the selected enzyme according to the procedure of the foregoing examples to give the desired active water-soluble cationic polymer-enzyme product.

For nonionic polymer-enzyme products, neutral groups may be attached to the polymer molecule after enzyme attachment, e.g., alkylamines, aminoalcohols, and alcohols may be attached via reaction with residual carboxylic or carboxylic acid anhydride groups of the polymer in the usual fashion.

Thus, in the foregoing manner, the following additional water-soluble products are prepared, the polymer in each case having cationic substituents: enzyme—dilower-alkylaminolower-alkanol esters of any of the polymers employed in the foregoing examples, enzyme—lower-alkylaminolower-alkanol esters of any of the polymers employed in the foregoing examples, and enzyme—aminolower-alkanol esters of any of the polymers employed in the foregoing examples; e.g. the alkaline protease-dimethylamino propanol ester of EMA, the neutral protease-ethylaminobutanol ester of EMA, and the papain-aminoethanol ester of polymaleicor polyacrylic anhydride or acid; enzyme—dilower-alkylaminolower-alkylimides of any of the polymers employed in the foregoing examples, enzyme—lower-alkylaminolower-alkylimides of any of the polymers employed in the foregoing examples, and enzyme—aminolower-alkylimides of any of the polymers employed in the foregoing examples, e.g., the alkaline protease-diethylamino propylimide of EMA, the neutral protease-methylaminobutylimide of EMA, and the papain-aminopentylimide of polymaleic or polyacrylic anhydride or acid; enzyme—dilower-alkylaminolower-alkylamides of any of the polymers employed in the foregoing examples, enzyme—lower-alkylaminolower-alkylamides of any of the polymers employed in the foregoing examples, enzyme—aminolower-alkylamides of any of the polymers employed in the foregoing examples, e.g., the alkaline protease-dimethylaminopropylamide of EMA, the neutral protease-ethylaminohexylamide of EMA, and the papain-aminopropylamide of polymaleic or polyacrylic anhydride or acid.

It is apparent from the foregoing that the preferred polymer-enzyme products of the invention are those water-soluble products wherein the polymer is selected from the group consisting of A. ethylene/maleic anhydride copolymer, styrene/maleic anhydride copolymer, vinyl methyl ether/maleic anhydride copolymer, vinylacetate/maleic anhydride copolymer, divinyl ether/maleic anhydride cyclocopolymer, polymaleic anhydride, polyacrylic anhydride, and cationic derivatives thereof,
and wherein the enzyme moiety comprises at least one enzyme selected from the group consisting of B. neutral protease, acid protease, alkaline protease, lipase, cellulase, dextranase, amylase, and asparaginase, and preferably wherein the enzyme moiety or moieties are entirely of microbiological origin.

Where a protease is named specifically in the foregoing, the specific protease may obviously be present along or in addition to another protease, whether specifically named or encompassed generically by the terms acid protease, neutral protease, and alkaline protease, as well as in addition to one or more nonproteolytic enzymes.

It is to be understood that the invention is not to be limited to the exact details of operation or exact compounds compositions, or procedures shown and described, as obvious modifications and equivalents will be apparent to one skilled in the art, and the invention is therefore to be limited only by the full scope of the appended claims. including the application of the doctrine of equivalents thereto.

We claim:

1. A water-soluble enzymatically active polymer-enzyme product wherein the enzyme is bound covalently through groups which are nonessential for enzymatic activity to (a) a water-soluble polymer comprising chains of carboxylic acid or carboxylic acid anhydride units, or (b) a water-soluble polymer comprising units of carboxylic acid or carboxylic acid anhydride groups separated by carbon chains of at least one and not more than four carbon atoms, said carbon chains being part of a unit which contains a maximum of 18 carbon atoms, wherein the polymer is selected from the group consisting of ethylene/maleic anhydride copolymer, styrene/maleic anhydride copolymer, vinyl methyl ether/maleic anhydride copolymer, vinyl acetate/maleic anhydride copolymer, divinyl ether/maleic anhydride cyclocopolymer, polymaleic anhydride, polyacrylic anhydride, and cationic derivatives thereof and wherein the enzyme moiety comprises at least one enzyme of microbial origin selected from the group consisting of neutral protease, acid protease, alkaline protease, lipase, cellulase, dextranase, amylase and asparaginase.

2. Product of claim 1, wherein the polymer is formed by polymerization of polymerizable acids or anhydrides, or by copolymerizing a polymerizable acid or anhydride with another copolymerizable monomer.

3. Product of claim 1, wherein the polymer is an EMA-type polymer.

4. Product of claim 3, wherein the polymer is EMA.

5. Product of claim 1, which is water-soluble EMA-lipase.

6. Product of claim 1, which is water-soluble EMA-cellulase.

7. Product of claim 1, which is water-soluble EMA-asparaginase.

8. Product of claim 1, which is water-soluble EMA-alkaline protease.

9. Product of claim 1, which is water-soluble EMA-neutral protease.

10. Product of claim 1, which is water soluble EMA-amylase.

11. Product of claim 1, wherein a plurality of different enzymes of microbiological origin are present in the water-soluble polymer-enzyme product.

12. Product of claim 1, which is a water-soluble EMA-alkaline protease, neutral protease product.

13. Product of claim 1, which is a water-soluble EMA-alkaline protease, neutral protease and amylase product.

14. Product of claim 1, which is a water-soluble EMA-alkaline protease, neutral protease and lipase product.

15. Product of claim 12, wherein the ratio of alkaline protease activity to neutral protease activity is about 0.25 to about 1.2 to 1.

16. Product of claim 1, which is water-soluble EMA-dextranase.

17. Product of claim 1, which is a water-soluble EMA-dextranase, neutral protease product.

18. Method of producing a water-soluble enzymatically active polymer-enzyme product wherein the enzyme is bound covalently through groups which are nonessential for enzymatic activity to (a) a water-soluble polymer comprising chains of carboxylic acid or carboxylic acid anhydride units, or (b) a water-soluble polymer comprising units of carboxylic acid or carboxylic acid anhydride groups separated by carbon chains of at least one and not more than four carbon atoms, said carbon chains being part of a unit which contains a maximum of 18 carbon atoms, which comprises the step of reacting the polymer and an enzyme under substantially noncross-linking conditions and according to conditions which do not operate to destroy enzymatic activity to produce a desired enzymatically active water-soluble polymer-enzyme product, wherein the polymer and enzyme are reacted together in dilute aqueous solution or suspension or with the enzyme in sufficient concentration to favor production of a noncross-linked polymer-enzyme product, and wherein the polymer is selected from the group consisting of an ethylene/maleic anhydride copolymer, styrene/maleic anhydride copolymer, vinyl methyl ether/maleic anhydride copolymer, vinyl acetate/maleic anhydride copolymer, divinyl ether/maleic anhydride cyclocopolymer, polymaleic anhydride, polyacrylic anhydride, and cationic derivatives thereof and wherein the enzyme moiety comprises at least one enzyme of microbial origin selected from the group consisting of neutral protease, acid protease, alkaline protease, lipase, cellulase, dextranase, amylase and asparaginase.

19. Process of claim 18 wherein the polymer is reacted with a plurality of different enzymes of microbiological origin to produce a water-soluble polymer-enzyme product having a plurality of different enzymes of microbiological origin bound therein.

* * * * *

UNITED STATES PATENT OFFICE
CERTIFICATE OF CORRECTION

Patent No. 3,625,827                          Dated December 7, 1971

Inventor(s) Bernard S. Wildi and Thomas L. Westman

It is certified that error appears in the above-identified patent and that said Letters Patent are hereby corrected as shown below:

| | |
|---|---|
| Col. 2, line 53<br>Page 4, line 20 | "(Sephadex Pharmacia Co. ..."<br>-- (Sephadex [TM], Pharmacia Co. ... -- |
| Col. 2, line 73<br>Page 5, line 7 | "evidences"<br>-- evidenced -- |
| Col. 4, line 54<br>Page 8, line 27 | "of coupling"<br>-- or coupling -- |
| Col. 5, line 18<br>Page 10, line 1 | "of the to the"<br>-- of the enzyme to the -- |
| Col. 7, line 11<br>Page 14, line 6 | "pehnylalkyl-phenyl"<br>-- phenylalkyl-phenyl -- |
| Col. 9, line 17<br>Page 18, line 17 | "7.25%"<br>-- amylase -- |
| Col. 11, line 38<br>Page 22, line 31 | "RF"<br>-- $R_f$ -- |
| Col. 12, line 55<br>Page 26, line 10 | "dialyzed against cold water and dialyzed"<br>-- dialyzed against cold water and lyophilized -- |
| Col. 13, line 47<br>(Amendment 21 May 1971)<br>Page 27, line 33 | "gamma"<br>-- microliters -- |
| Col. 15, line 14<br>Page 30, line 32 | "a weighted"<br>-- A weighed -- |
| Col. 16, line 3<br>Page 32, line 21 | "300 m."<br>-- 300 ml -- |

/1/

UNITED STATES PATENT OFFICE
CERTIFICATE OF CORRECTION

Patent No. 3,625,827            Dated December 7, 1971

Inventor(s) Bernard S. Wildi and Thomas L. Westman

It is certified that error appears in the above-identified patent and that said Letters Patent are hereby corrected as shown below:

| | |
|---|---|
| Col. 16, line 4<br>Page 32, line 22 | "ph"<br>-- pH -- |
| Col. 18, line 15<br>Page 37, line 12 | "contrifugation"<br>-- centrifugation -- |
| Col. 18, Table 6<br>Page 38, Table 6 | 1st row of figures under "pH*" should be in line with other rows.<br>2nd figure under "Pepsin" should be -- 54 -- and not "15" thus 2nd line should read: 1.4  54  29  —  . |
| Col. 19, line 5<br>Page 38, line 27 | "(8,000 r.p.m."<br>-- (8,000 r.p.m.) -- |
| Col. 21, line 42<br>Page 43, line 15-16 | "Dean-StarK"<br>-- Dean-Stark -- |
| Col. 23, line 53<br>Page 47, line 32 | "polymaleicor"<br>-- polymaleic or -- |
| Col. 24, line 14<br>Page 49, line 5 | "along"<br>-- alone -- |
| Col. 24, line 20<br>Page 49, lines 10-11 | "compounds compositions"<br>-- compounds, compositions -- |

Signed and sealed this 13th day of June 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,625,827              Dated December 7, 1971

Inventor(s)   Bernard S. Wildi et al.

It is certified that error appears in the above-identified patent and that said Letters Patent are hereby corrected as shown below:

The term of this patent subsequent to

October 26, 1988 has been disclaimed.

Signed and sealed this 13th day of May 1975.

(SEAL)
Attest:

RUTH C. MASON
Attesting Officer

C. MARSHALL DANN
Commissioner of Patents
and Trademarks